United States Patent [19]

Marti

[11] Patent Number: 5,293,228
[45] Date of Patent: Mar. 8, 1994

[54] METHOD FOR THE CODING OF COLOR IMAGES AT HIGH COMPRESSION RATE WITHOUT FILTERING, CORRESPONDING DECODING METHOD, CODER, DECODER AND APPLICATIONS

[75] Inventor: Bernard Marti, Noyal-sur-Vilaine, France

[73] Assignees: France Telecom, Les Moulineaux; Telediffusion De France S.A., Montrouge, both of France

[21] Appl. No.: 883,879

[22] Filed: May 15, 1992

[30] Foreign Application Priority Data

May 17, 1991 [FR] France ............................... 91 06134

[51] Int. Cl.[5] .......................... H04N 7/133; H04N 7/13
[52] U.S. Cl. ..................................... 348/391; 348/472
[58] Field of Search .......................... 358/13, 133, 136; H04N 7/133, 7/13, 11/16, 11/4

[56] References Cited

U.S. PATENT DOCUMENTS

| | | | |
|---|---|---|---|
| 3,795,763 | 3/1974 | Golding | 358/13 |
| 4,129,882 | 12/1978 | Limb | 358/13 |
| 4,275,411 | 6/1981 | Lippel | 358/13 |
| 4,460,924 | 7/1984 | Lippel | 358/13 |
| 4,584,597 | 4/1986 | Guichard | 358/13 |
| 4,817,182 | 3/1989 | Adelson | 358/13 |
| 4,951,139 | 8/1990 | Hamilton | 358/13 |
| 5,073,820 | 12/1991 | Nakagawa | 358/13 |
| 5,130,786 | 7/1992 | Murata | 358/13 |
| 5,157,488 | 10/1992 | Pennebaker | 358/13 |
| 5,162,898 | 11/1992 | Aono | 358/13 |
| 5,172,218 | 12/1992 | Wilkinson | 358/13 |

FOREIGN PATENT DOCUMENTS

3505368A1 8/1986 Fed. Rep. of Germany .
WO91/01613 2/1991 PCT Int'l Appl. .

OTHER PUBLICATIONS

C-Cube Microsystems "JPEG Image Compression Processor", Product Brief TM (10 pages) Jul. 1990.
International Telephone and Telegraph Consultive Committee (CCITT) "Draft CCITT Rec. T. JPEG (Digital Compression of Continuous-tone Still Images", transmittal page, contents, forward, pp. 1-1, 2-1, and 3-1 and 3-4, Mar. 18, 1991.

Primary Examiner—Tommy P. Chin
Assistant Examiner—Bryan S. Tung
Attorney, Agent, or Firm—Kinney & Lange

[57] ABSTRACT

A method for the coding of images represented by source signals by means of which a luminance signal is formed by linear combination, using positive coefficients of the source signals, and at least one color signal, the luminance and color signals being digitized, sampled at the same resolution, and subjected to a reversible mathematical transformation in the frequency domain. The method comprises the steps of quantizing and assigning a code value to the continuous component and to each component of a set of alternating components of the transformed luminance signal, and quantizing and assigning a code value to only the continuous component of each of the transformed color signals, a set of alternating components being reconstructed by estimation during the decoding for each of the transformed color signals. The method can be applied to color images of any type represented as the superimposition of monochromatic images, whether the images are still images or motion images.

20 Claims, 2 Drawing Sheets

METHOD FOR THE CODING OF COLOR IMAGES AT HIGH COMPRESSION RATE WITHOUT FILTERING, CORRESPONDING DECODING METHOD, CODER, DECODER AND APPLICATIONS

BACKGROUND OF THE INVENTION

1. Field of the Invention

The field of the invention is that of the coding of color images. More specifically, the invention relates to the coding of color images constituted by a set of at least two independent, monochromatic channels or images. This coding may notably be the coding of three signals, red, green and blue, coming from pick-up instruments or cameras and used for the reproduction of the images, for example on a television screen.

The coding of these signals is very often necessary, to compress the information that they contain. This is notably the case when it is desired to transmit them, in order to reduce their bit rate, or store them, for example on tape or digital disk, in order to reduce the space that they occupy.

The invention can be applied as much to the coding of still images as to that of motion images. It depends neither on the standard of the image nor on the type of prior and/or subsequent processing undergone by the signals.

2. Description of the Prior Art

There already exists an international standard for the coding of still color images, the ISO 10 918 standard, also known by the designations JPEG Joint Photographic Experts Group) and ISO-DCT. This standard is unaffected by the type of color space used to represent a color picture. Indeed, it considers a color image to be a plurality of monochromatic images processed independently.

The JPEG standard enables the simultaneous processing of up to 256 monochromatic channels. In practice, there are 1, 3 or 4 channels. In certain cases, however, there is a larger number of images. Thus many satellites, for example meteorological observation satellites, deliver the three standard color signals as well as several signals corresponding to shots taken in the infrared range. It can be clearly seen that, in this case, it is very important to code these images, in order to reduce their transmission bit rate, limit the space needed for their storage or, again, enable their delivery by the telephone system.

There is a similar known standard for the coding of motion color images. This is the ISO 11172 standard or MPEG (Motion Picture Experts Group) standard.

In both cases, the color image is therefore considered to be the sum of three (or more) independent channels or matrices of pixels. The choice of these channels is therefore a matter of application.

Three color space representations are presently used as a matter of common practice: YUV, RGB (red, green, blue) and JMC (yellow, magenta, cyan) or JMCK.

The YUV representation is derived from the CCIR recommendation 601. The three dot matrices are respectively the matrices of the luminances with full resolution (Y) and two color difference matrices $D_R(U)$ and $D_B(V)$ filtered with half-resolution in both directions, horizontal and vertical. This choice results from the implicit assumption, which is an obvious one in the context of a television studio, that the conversion between the image-taking color space and the coding space is done on analog signals, for which the matrix processing and filtering operations present no technological difficulties.

The analog-digital conversion done after these operations leads to a representation of 16 bits per pixel instead of 24 (a monochromatic pixel being coded on an octet). An ADCT (adaptive discrete cosine transform) compression is done on this already compressed image by analog means. This transformation assigns quantization values variable as a function of the rank or order of the coefficient considered and of the quality or bit rate desired.

At restitution, it is necessary to carry out a reverse matrix processing operation which is generally obtained after a digital-analog conversion. However, in a microcomputer or computer communications environment, the matrix processing and filtering should be done digitally, for want of specialized analog circuits in the equipment of this range. These operations prove to be particularly costly in terms of processing time.

Moreover, in addition to the technical difficulties, the operations of sub-sampling filtering in both directions introduce fuzziness during the reconstruction of the images.

The RGB color space representation is the direct representation of the image-shooting step and of the reproduction step. It calls for no filtering operation but gives the compressor a representation with 24 bits per pixel (or three independent representations with 8 bits per pixel). Its performance characteristics in terms of compression/quality ratio are therefore lower than those of the YUV representation, which has only 16 bits per pixel before compression. By contrast, it is easier to implement in a microcomputer or computer communications context, owing notably to the fact that there is no filtering.

The trichromatic or quadrichromatic JMC(K) or YMC(K) representation is the one resulting from a separation of colors for printing. It is well suited to the printed reproduction of documents but, for the purpose of screen display, it requires a return to the RGB space. Furthermore it is constituted by a primary representation, before compression, with 24 to 32 bits per pixel. It is well suited to the world of publishing and of computer-aided page make-up but less well suited to computer communications.

It is thus seen that the RGB representation, which is more universal, is the most promising one from the viewpoint of the applications and of the simplicity of the processing operations. However, it proves to be less efficient as regards the data compression algorithms.

The YUV representation is often preferred to the RGB representation, despite the complexity of the processing. The main drawback of the YUV representation is the need for a filtering operation which, when done by digital methods, calls for a prohibitive amount of time if it is done by software, or else calls for the use of a DSP (digital signal processor) or specialized circuits. Moreover, this filtering naturally leads to a loss of image quality, notably by producing fuzzy contours.

SUMMARY OF THE INVENTION

It is an aim of the invention to overcome these different drawbacks of the prior art.

More specifically, an aim of the invention is to provide a coding method, and a corresponding decoding method, with a high rate of compression, one that is higher than or at least equal to that obtained by means of the YUV representation.

Another aim of the invention is to provide methods such as these requiring no operations of complex processing of the images considered and, notably, no filtering operations, whether at the coding stage or at the decoding stage. Indeed, the invention is aimed at preserving the original resolution of each monochromatic channel, without compression, before the coding proper.

It is a particular aim of the invention, in a related manner, to provide methods such as these that can be easily set up, at low cost, in integrated circuits and that do not call for the use of specialized signal processing circuits.

The invention is also aimed at providing methods such as these, capable of being implemented as much for the coding of still images as for the coding of motion images.

Again, it is another particular aim of the invention to provide methods such as these, giving the RGB color space representation the advantages of the YUV color space representation, without retaining its drawbacks.

In a complementary way, the invention provides a coding method that can be used to obtain, directly, an achromatic representation of the coded color image.

The invention is also aimed at providing coders and decoders that implement these methods, notably for the transmission of images, for example in television, visual phone technology, fascimile, computer communications and other applications, and for the storage of images on tapes or on disks.

These aims, as well as others that shall appear hereinafter, are achieved according to the invention by means of a method for the coding of color images represented by at least two source signals comprising the following steps:

forming a luminance signal, by linear combination of said at least two source signals, using positive coefficients, and forming at least one color signal;

digitizing said luminance and color signals;

sampling at a same resolution said digitized luminance and color signals;

subjecting said sampled luminance and color signals to a reversible mathematical transformation in the frequency domain, associating to each of said sampled signals a transformed signal comprising a series of components consisting of one continuous (DC) component and of alternating (AC) components;

quantizing and assigning a code value to said continuous component and to each component of a set of said alternating components of the transformed luminance signal; and quantizing and assigning a code value to only said continuous component of each of said transformed color signals.

The non-transmission (or the non-storage) of the alternating components of the color signals enables the total compression rate to be greatly improved, without calling for any specific processing operation such as a sub-sampling filtering operation. Indeed, for example, the quantity of information elements to be taken into account is practically divided by three in the case of a trichromatic image.

As shall be seen hereinafter, it is relatively easy to reconstruct the non-transmitted components by using the correlations between the different signals in the transformed space (instead of using them in the original image space, by the already described filtering operation).

The term "luminance signal" refers to any linear combination, using positive coefficients, of all the source signals. Thus, in the case of the R, G, B signals, it is a luminance in the strict sense, from the photometrical viewpoint. In more particular cases, such as those bringing infra-red source signals into play, this term should naturally be extended to cover a linear combination of all the source signals, including those that are outside the visible domain.

Similarly, the color signals include all the source signals, whether they belong to the visible domain, the infra-red domain or the ultra-violet domain.

Advantageously, the coding method also includes the following steps:

estimating a set of estimated alternating components of each of said transformed color signals, as a function of said set of quantized and coded alternating components of the transformed luminance signal and of said quantized and coded continuous components of each of said transformed luminance and color signals;

determining a set of values of difference between the alternating components of each of said transformed color signals and each corresponding estimated alternating component;

quantizing and assigning a code value to each difference value of each of said sets of difference values.

In this way, it is possible to make an exact reconstruction of the non-transmitted components, by compensation for the chromatic details. The fact of taking account of the differences instead of taking account of the components themselves is especially promising in terms of coding. Indeed, it would appear that the values of a large number of these differences are equal to zero or are very low. The coding is thereby made easier.

Preferably, said estimation step carries out the following computation for each of said components of said sets of alternating components of each of said transformed color signals:

$$\tilde{A}_{iC} = A_{iY} \times (C_C/C_Y)$$

where:

$A_{iC}$ is the prediction of the i order alternating component of one of said transformed color signals:

$A_{iY}$ is the i order alternating component of said transformed luminance signal;

$C_C$ is the continuous component of one of said transformed color signals;

$C_Y$ is the continuous component of said transformed luminance signal.

The alternating components correspond to the contours of an image. As a very general rule, these contours are relatively independent of the color. The invention therefore relies on the luminance signal alone, to determine the contours, and predicts the alternating values of the color signals in relying on the ratio of the continuous component of the color signal to that of the luminance signal in the image block considered.

In an advantageous embodiment, said operations of assigning a code value are done according to an entropy coding.

This method proves to be especially promising for the coding of the signals of differences of colors, which very often show long sequences of zero values after quantization.

Advantageously, the coding method may also include a step for the synchronization of the contours of each monochromatic image, or image block, corresponding to each of said luminance and color signals, by the selection of a local reversible mathematical transformation from a set of at least two transformations, said selected transformation being the one that enables the most efficient juxtaposition of all of said monochromatic images or blocks of images.

The invention also relates to a method for the decoding of color image signals comprising the following steps:

decoding and dequantizing each code value of a first set of code values corresponding to the continuous component and to each component of a set of alternating components of a transformed luminance signal and to the continuous component alone of each of at least one transformed color signal; and estimating a set of estimated alternating components of each of said transformed color signals, as a function of said set of decoded alternating components of said transformed luminance signal and of the decoded continuous components of each of said transformed luminance and color signals.

Said estimation step advantageously comprises the performance of the operation $\overline{A}_{iC} = A_{iY}\tilde{x}(C_C/C_Y)$, as does the above-mentioned prediction step.

Thus, the alternating components are reconstructed by means of a simple multiplication. The invention is based on the exploitation of the correlations between the transformed signals which are no longer considered to be independent.

In an advantageous embodiment, said decoding method also includes the following steps:

decoding and dequantizing each code value of a second set of code values corresponding to the difference between the alternating components of each of said transformed color signals and the corresponding estimated alternating components; and adding to said estimated alternating components of each of said transformed color signals of the corresponding decoded difference values, so as to reconstitute the alternating components of each of said transformed color signals.

The use of these corrective terms enables the precise reconstruction of the alternating components of the color signals, and no longer a simple estimation.

It is clear that these corrective terms are optional. It is naturally possible to decode images without taking them into account, even when they have been coded during the coding operation. It is also possible to provide for coders and/or decoders having two levels of quality, as a function of needs, depending on whether or not the corrective terms are taken into account.

The invention also relates to all coders and/or decoders implementing at least one of these coding and/or decoding methods and, notably, to the transmitters and receivers of color image signals and to means for the storage of images, whether still images and/or motion images.

BRIEF DESCRIPTION OF THE DRAWINGS

Other features and advantages of the present invention shall appear from the following description of a preferred embodiment of the invention, given by way of a non-restrictive illustration, and from the appended drawings, of which.

DETAILED DESCRIPTION

As stated here above, the invention is based essentially on the taking into account of the correlations of the different signals representing an image in the transformed domain of the frequencies.

On the contrary, according to the prior art, the correlations existing in the image space were exploited, for example by sub-sampling, but thereafter all the signals were considered to be independent. Moreover, this principle is the basis of the JEPG and MPEG standards.

The invention is notably based on the following analysis: in an image, the contours are generally the same, irrespectively of the color considered. Moreover, from the psychovisual viewpoint, it is known that the eye shows little sensitivity to the color of the contours. A single contour information element is therefore enough: it is not necessary to code these contours for all the color signals.

Hereinafter, it shall be assumed that any spatial matrix comprises a continuous (DC) component C and alternating (AC) components $A_i$, where i represents the rank or order of the component, according to the notation related to the zigzag numbering of the ISO 10918 standard.

According to the invention, therefore, only one overall matrix of the spatial frequencies, the luminance matrix, is considered.

Since the luminance is a positive linear combination of the different color signals, it is clear that a luminance component is zero only if the corresponding components of the color signals are zero simultaneously. It is therefore easy, in this way, to determine the zero values of the spatial matrices of the color signals.

The other components are then reconstructed by the application, to the corresponding alternative component of luminance, of the ratio of the continuous components $C_C/C_Y$ (the index C represents the color signal considered). Indeed, given the properties of the color images, it is highly probable, for RGB signals, that $A_{iR} = A_{iY}\tilde{x}(C_R/C_Y)$ and that $A_{iB} = A_{iY}\tilde{x}(C_B/C_Y)$. For greater precision in the reconstruction, it is also possible to take account of corrective terms as shall be seen here below.

Figure 1:
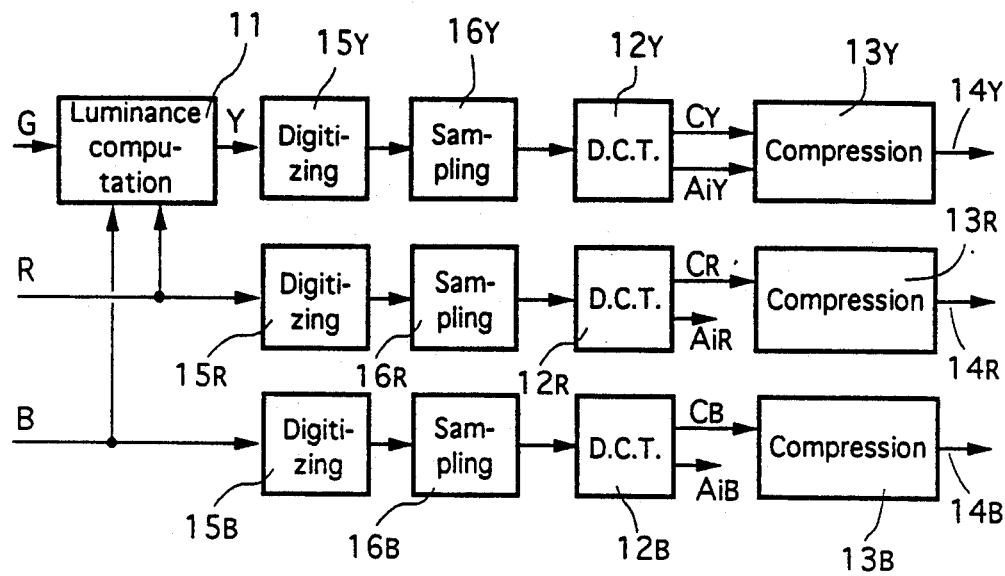
FIG. 1 shows a block diagram of a coder according to the invention, in its simplified version.

FIG. 1 shows the block diagram of a first embodiment of a coder that does not carry out any chromatic compensation.

In this preferred embodiment, we consider the coding of RGB (red, green, blue) signals such as those coming from a television camera. This representation is particularly advantageous, since it corresponds directly to shooting and to reproduction, without any particular processing. It is clear, however, that the invention can equally well be applied to any other type of representation and, notably, to the YUV and JMC(K) types of representation.

The first step of the coding consists in the determining, by means of a matrix 11, of a luminance signal Y, on the basis of the original signals R, G, B. This luminance may be computed, for example, on the basis of the standard formula: Y=0.59 x G+0.30 x R+0.11 x B. Any other linear combination using positive coefficients may also be chosen.

Each of the signals Y, R and B is then digitized to a selected resolution by digitizing modules $15_Y$, $15_R$, $15_B$. The digitized signals are sampled at the same resolution by sampling modules $16_Y$, $16_R$, $16_B$, and then transformed in the frequency space, by means of a reversible mathematical transformation module $12_Y$, $12_R$, $12_B$. This is advantageously a discrete cosine transform (DCT). Other transformations, such as the Fourier, Haar or Hadamard transformations, may naturally also be used. For each image block considered, these transformation modules deliver a continuous component C on the block, and a set of alternating components $A_i$.

The set of continuous ($C_Y$) and alternating ($A_{iY}$) components is then transmitted to a compression module $13_Y$ which carries out the quantization and assigning of a code value to each of the components. The quantization is preferably adaptive (for example according to the already mentioned ADCT method) as a function of different criteria, notably psychovisual ones. The assigning of a code value is done in a standard way, preferably by means of an entropy code, such as a Huffman code.

By contrast, only the continuous components $C_R$ and $C_B$ of the color signals are considered (in this embodiment, it is therefore clear that it is not necessary to compute the alternating components of these signals which appear in FIG. 1 only to make it easier to understand the invention).

The compression modules $13_R$ and $13_B$ therefore carry out the coding of $C_R$ and $C_B$ in a simple way. The quantization and the code used may be identical to or distinct from those implemented for the compression of the luminance signal. The coding may be, for example, a coding at the first level of the ADCT method, with only the continuous component being taken into account.

The coded signals $14_Y$, $14_R$, $14_B$ are then emitted and/or stored or again possibly subjected to another complementary processing operation of compression, encryption, etc.

In this embodiment, the compression rate obtained is clearly greater than that of the YUV method, without its being necessary to carry out any sub-sampling filtering operation. Indeed, if we consider the case of 64-element blocks, it is necessary, for each block, to compress:

- 3×64=192 elements for the standard RGB representation;
- 64+(2×16)=96 elements for the standard YUV representation (the two color signals being filtered at half-resolution in both dimensions);
- 64+2=66 elements for the YRB representation according to the invention.

Figure 3:
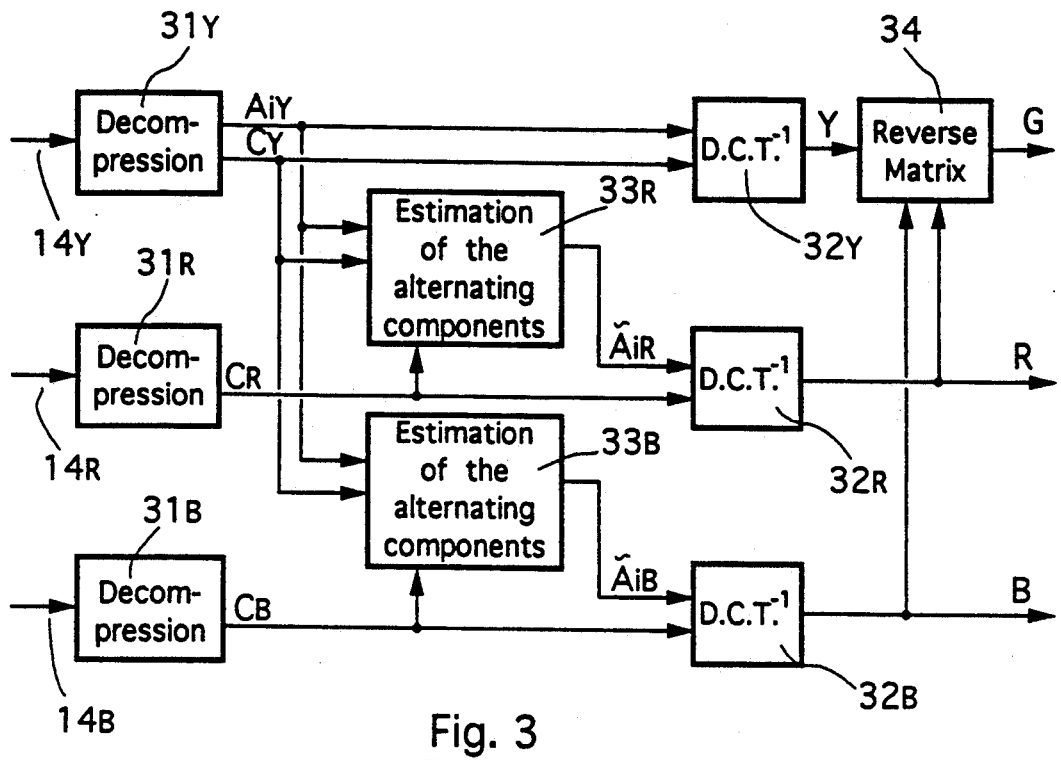
FIG. 3 shows a block diagram of a decoder according to the invention, corresponding to the coders of FIGS. 1 and 2 and not carrying out the compensation for chromatic details.

In this case, the non-transmitted components are reconstituted, by estimation, during the decoding operation. FIG. 3 illustrates an example of a corresponding decoder.

The signals $14_Y$, $14_R$, $14_B$, emitted or stored, coded by means of the coder of FIG. 1 (or of the coder of FIG. 2 as shall be seen here below) are each decompressed by means of a decompression module $31_Y$, $31_R$, $31_B$ carrying out a decoding and a quantization that are the reverse of those carried out in the corresponding decompression modules $13_Y$, $13_R$, $13_B$, in a standard manner.

The module $31_Y$ delivers the continuous ($C_Y$) and alternating ($A_{iY}$) components of the luminance signal Y which are transformed, by means of a transform $32_Y$, which is the reverse of the one used during the coding, in such a way as to obtain the original signal Y.

By contrast, the decompression modules $31_R$ and $31_B$ naturally restore only the continuous components $C_R$ and $C_B$ of the color signals, which are transmitted to two reverse transformation modules $32_R$, $32_B$.

To reconstitute the color signals R and B, it is therefore necessary to reconstruct their alternating components $A_{iR}$ and $A_{iB}$.

For this purpose, the decoder according to the invention comprises a module $33_R$, $33_B$ for the estimation of these alternating components, for each color signal R, B. As has already been specified, this is an essential characteristic of the invention which makes use, in these estimation modules, of the correlations of the different signals in the transformed space of the frequencies.

The following is the computation done by the estimation modules:

$$\widetilde{A}_{iR} = A_{iY} \times (C_R / C_Y)$$

$$\widetilde{A}_{iB} = A_{iY} \times (C_B / C_Y)$$

In other words, the contours (alternating components) are considered to be located at the same positions for the different signals, which is practically always the case. Besides, this is all the more probable as the luminance signal Y, in which all the color signals play a part, is taken as the basis.

The value of each non-zero component is determined by the application of the ratio of the continuous components, which correspond to the intensity of each signal.

Thus, the complete matrix ($C_Y$, $A_{iY}$) of the luminance signal makes it possible to predict the position of the zero values (if $A_{iY}=0$, then $A_{iR}=0$ and $A_{iB}=0$) of the matrices of the color signals. The value of the non-zero coefficients $A_{iR}$ and $A_{iB}$ are then estimated.

The special case where $C_Y=0$ should naturally be processed independently. However, it does not pose any problem since $C_Y$ can be equal to zero only if $C_R$ and $C_B$ are equal to zero simultaneously. The alternating coefficients will then all be equal to zero.

It must be noted that these computations are particularly simple ones. Only one multiplication is necessary for each alternating component, the ratio $C_Y/C_R$ or $C_Y/C_B$ being determined once and for all, for each block.

Tests show that this method gives very good results, with a compression rate greater than that obtained by the standard YUV method. However, as shall be seen in relation with FIGS. 2 and 4, it is possible to provide for means, in a second embodiment, enabling the reconstitution of the real values of the alternating components of the color signals, and no longer that of the estimations.

The reverse transformation modules $32_Y$, $32_R$, $32_B$ then deliver the luminance signals Y and the R and B color signals. A reverse matrix 34 of the matrix 11, used for the coding, enables the recovery of the third color signal G.

Figure 2:
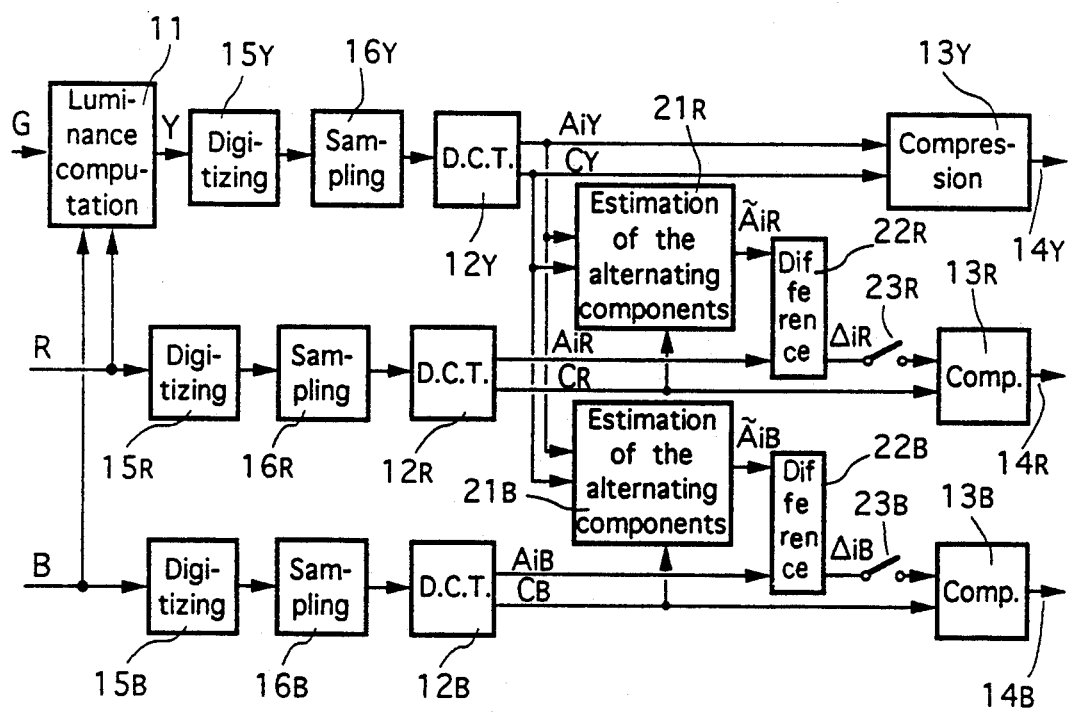
FIG. 2 shows a block diagram of a second coder, providing for the supplementary coding of compensation data for the chromatic details.

FIG. 2 shows a second type of coder, hereinafter called a coder with compensation for the chromatic details. Only the differences from the coder of FIG. 1 shall be described.

The purpose of this coder is to enable the perfect reconstruction, at decoding, of the components $A_{iR}$, $A_{iB}$. To this end, it comprises two modules $21_R$, $21_B$ for the estimation of the alternating components. These modules are identical to the estimation modules $33_R$ and $33_B$ implemented in the decoders.

Thus, the coder knows the values $\widetilde{A}_{iR}$, $\widetilde{A}_{iB}$ which will be determined by the decoders and is capable, by a simple difference $22_R$, $22_B$ between these values and the real values $A_{iR}$, $A_{iB}$, of giving values of divergence $\Delta_{iR}$, $\Delta_{iB}$.

In other words, the residual part of the alternating component is coded by means of the compression modules $13_R$ and $13_B$, in assuming that the first run has been made with a fictitious quantization factor, the respective remainders of which are:

$$\Delta_{iR} = A_{iR} - A_{iY} \times (C_R/C_Y) \text{ and}$$
$$\Delta_{iB} = A_{iB} - A_{iY} \times (C_B/C_Y).$$

In principle, except in very special cases, these differences are often zero, after quantization. Their transmission and/or their storage therefore have rather little influence on the compression rate if an entropy code such as a Huffman code is used.

As has been seen with the coder of FIG. 1, these difference values are not obligatory. However, they make it possible to compensate for certain details of color and hence to improve the quality of the final image. It is therefore possible to provide for coders with two levels of quality, as a function of requirements.

To this end, the coder of FIG. 2 comprises means $23_R$ and $23_B$ making it possible, selectively, to take account or not to take account of the differences $\Delta_{iR}$ and $\Delta_{iB}$. In the latter case, this coder works in the same way as the coder of FIG. 1.

It is also possible to provide for these selection means $23_R$ and $23_B$ to be controlled dynamically, and possibly independently, so as to enable a regulation of the transmission bit rate.

Figure 4:
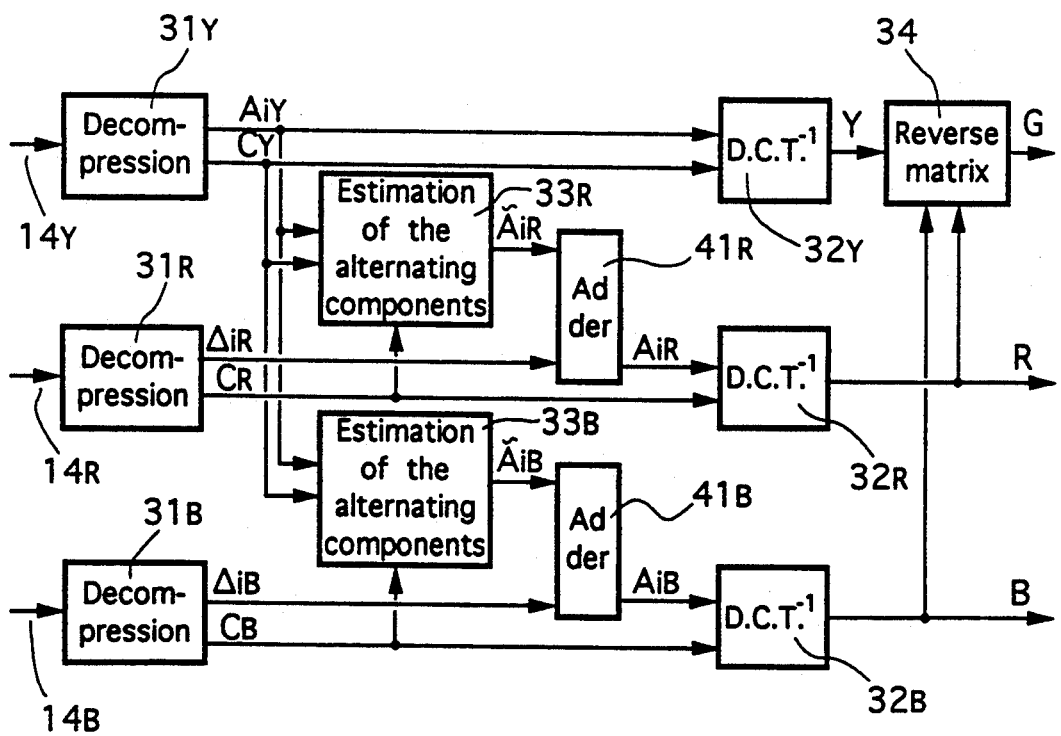
FIG. 4 shows a block diagram of a decoder according to the invention, corresponding to the coders of FIGS. 1 and 2, with compensation for the chromatic details.

FIG. 4 shows the block diagram of a decoder corresponding to the coder of FIG. 2.

The decompression modules $31_Y$, $31_R$ and $31_B$ respectively deliver the components $C_Y$, $A_{iY}$, $C_R$, $C_B$ and the differences $\Delta_{iR}$ and $\Delta_{iB}$.

Just as in the decoder of FIG. 3, the estimation modules determine the estimated values of the alternating components $A_{iR}$ and $A_{iB}$ of the color signals.

An adder $41_R$, $41_B$ can then be used to compensate for the chromatic details for each color signal, and gives the reverse transformation modules $32_R$ and $32_B$ the exact alternating components:

$$A_{iR} = \widetilde{A}_{iR} + \Delta_{iR}$$

$$A_{iB} = \widetilde{A}_{iB} + \Delta_{iB}$$

The end of processing is identical to the one described for the decoder of FIG. 3.

It must be noted that this decoder makes it possible, without adaptation, to carry out the decoding of the signals coded without compensation for the chromatic details. In this case, the differences $\Delta_{iR}$ and $\Delta_{iB}$ are equal to zero.

The embodiments described here above consider the coding of RGB signals corresponding to the most universal representation. The methods of the invention are however in no way limited to signals of this type but, on the contrary, enable the coding and decoding of all the color images, provided that they are represented as a superimposition of monochromatic images. It is notably easy to extend the scope of the invention to the coding of more than three signals.

The signals may also be of any origin. The invention can be applied to the coding of any source signals, whether they have come from a pick-up device (a television camera, photographic camera etc.) or from restitution means or image creation means (for example means for the creation of synthetic images or computer processed images).

The invention furthermore uses a luminance signal. This has numerous advantages. It is known, notably from the physiological viewpoint, that the cones of the retina are not sensitive to colors but are sensitive to the fineness of the details. Besides, the positioning of luminance signal directly facilitates conversion into the achromatic representation (known as the black-and-white representation) directly obtained by this signal.

Besides, it will be noted that the invention does not imply the coding of all the alternative components of the luminance signal. It is possible to provide for only one set of first components (first according to the zigzag numbering) to be taken into account. The number of elements of this set of components may be variable, either to offer several levels of image quality or as a function of psychovisual criteria, related for example to the analysis of the motion. Naturally, in this case, only the same-order alternating components $A_{iR}$ and $A_{iB}$ of the color signals will be reconstructed at the decoding.

What is claimed is:

1. A method for the coding of color images represented by at least two source signals comprising the following steps:

forming a luminance signal, by linear combination of said at least two source signals, using positive coefficients;

forming at least one color signal, from at least one of said source signals;

digitizing said luminance signal and said at least one color signal, so as to form a digitized luminance signal and at least one digitized color signal;

sampling said digitized luminance signal and said at least one digitized color signal, so as to form a sampled luminance signal and at least one sampled color signal;

subjecting said sampled luminance signal and said at least one sampled color signal to a reversible mathematical transformation in the frequency domain, associating to said sampled luminance signal a transformed luminance signal and associating to each said at least one sampled color signal a corresponding transformed color signal, each of said transformed luminance signal and said at least one transformed color signal comprising a series of components consisting of one continuous component and of alternating components;

quantizing and assigning a code value to the continuous component and to each component of a set of the alternating components of the transformed luminance signal to provide a coded continuous component and a set of coded alternating components of the transformed luminance signal; and quantizing and assigning a code value to only the continuous component of each said at least one transformed color signal to provide a coded continuous component of each of said at least one transformed color signal.

2. A coding method according to claim 1 further comprising the steps of:
estimating a set of estimated alternating components of each said at least one transformed color signal, as a function of the set of coded alternating components of the transformed luminance signal, of the coded continuous component of said transformed luminance signal and of the coded continuous component of said at least one transformed color signal;
determining a set of values of difference between the alternating components of each said at least one transformed color signal and each corresponding estimated alternating component;
quantizing and assigning a code value to each value of difference of each of the sets of values of difference.

3. A method according to claim 2, wherein the step of estimating carries out the following computation for each of said set of estimated alternating components $$\overline{A}_{iC} = A_{iY} \times (C_c/C_y)$$

where:
$\overline{A}_{iC}$ is the prediction of the i order alternating component of one of said at least one transformed color signal;
$A_{iY}$ is the i order alternating component of said transformed luminance signal;
$C_C$ is the continuous of one of said at least one transformed color signal;
$C_Y$ is the continuous component of said transformed luminance signal.

4. An application of the coding method according to claim 2 to the coding of still images.

5. An application of the coding method according to claim 2 to the coding of motion images.

6. A method according to claim 2, wherein the steps of quantizing and assigning a code value comprise a step of assigning a code value according to an entropy coding.

7. A method according to claim 2, further including a step of synchronizing contours of a set of at least two monochromatic images, each monochromatic image corresponding to a reconstructed image form each of said luminance signal and of said at least one color signal respectively, comprising a step of selecting a local reversible mathematical transformation from a set of at least two transformations, the selected transformation being the one that enables the most efficient juxtaposition of all of the monochromatic images of said set of at least two monochromatic images.

8. A method according to claim 1, wherein the steps of quantizing and assigning a code value comprise a step of assigning a code value according to an entropy coding.

9. A method according to claim 1, further including a step of synchronizing contours of a set of at least two monochromatic images, each monochromatic image corresponding to a reconstructed image from each of said luminance signal and of said at least one color signal, respectively, comprising a step of selecting a local reversible mathematical transformation from a set of at least two transformations, the selected transformation being the one that enables the most efficient juxtaposition of all of the monochromatic images of said set of at least two monochromatic images.

10. A coder of color image signals represented by at least two source signals comprising:
means for forming a luminance signal, by linear combination of said at least two source signals, using positive coefficients, and forming at least one color signal;
means for digitizing said luminance signal and said at least one color signal to form a digitized luminance signal and at least one digitized color signal;
means for sampling said digitized luminance signal and said at least one digitized color signal to form a sampled luminance signal and at least one sampled color signal;
means for subjecting said sampled luminance signal and said at least one sampled color signal to a reversible mathematical transformation in the frequency domain to associate said sampled luminance signal to a transformed luminance signal and to associate each said at least one sampled color signal to a corresponding transformed color signal, each said transformed luminance signal and said at least one transformed color signal comprising a series of components consisting of one continuous component and alternating components;
means for quantizing and assigning a code value to the continuous component and to each component of a set of the alternating components of the transformed luminance signal to form a coded continuous component and a set of coded alternating components of the transformed luminance signal; and
means for quantizing and assigning a code value to only the continuous component of each said at least one transformed color signal to form a coded continuous component of each said at least one transformed color signal.

11. A coder according to claim 10 further comprising:
means for estimating a set of estimated alternating components of each said at least one transformed color signal, as a function of the set of coded alternating components of the transformed luminance signal, of the coded continuous component of each of said transformed luminance signal and of said coded continuous component of said at least one transformed color signal;
means for determining a set of values of difference between the alternating components of each said at least one transformed color signal and the corresponding estimated alternating components;
means for quantizing and assigning a code value to each difference value of each the sets of values of difference.

12. A method for the decoding of coded color image signals comprising a first set of code values corresponding to the continuous component and to each component of a set of alternating components of a transformed luminance signal and to only the continuous component of each at least one transformed color signal, the method comprising the steps of:
decoding and dequantizing each code value of said first set of code values, providing both a decoded continuous component and a set of decoded alternating components of said transformed luminance signal and only a decoded continuous component of each said at least one transformed color signal; and estimating a set of estimated alternating components of each said at least one transformed color signal, as a function of said set of decoded alternating components of said transformed luminance signal and of the decoded continuous components of said transformed luminance signal and of said at least one transformed color signal.

13. A method according to claim 12, wherein the step of estimating carries out the following computation for each of the components of the set of estimated alternating components of each said at least one transformed color signal:

$$\widetilde{A}_{iC} = A_{iY} \times (C_C/C_Y)$$

where:
- $\widetilde{A}_{iC}$ is the prediction of the i order alternating component of one of said at least one transformed color signal;
- $A_{iY}$ is the i order alternating component of said transformed luminance signal;
- $C_C$ is the continuous component of one of said at least one transformed color signal;
- $C_Y$ is the continuous component of said transformed luminance signal.

14. A method according to claim 12, wherein said coded color image signals further include a second set of code values corresponding to the difference between the alternating components of each said at least one transformed color signal and the corresponding estimated alternating components, the method further comprising the steps of:

decoding and dequantizing each code value of said second set of code values; and adding to the estimated alternating components of each said at least one transformed color signal of the corresponding decoded difference values, so as to reconstitute the alternating components of each said at least one transformed color signal.

15. A decoder of coded color image signals consisting in a first set of code values respectively corresponding to component and to each component of a set of alternating components of a transformed luminance signal and to only the continuous component of each of at least one transformed color signal, the decoder comprising:

means for decoding and dequantizing each code value of said first set of code values providing both a decoded continuous component and a set of decoded alternating components of said transformed luminance signal and only a decoded continuous component of each said at least one transformed color signal; and means for estimating a set of estimated alternating components of each said at least one transformed color signal, as a function of said set of decoded alternating components of said transformed luminance signal and of the decoded continuous components of each said transformed luminance signal and of said at least one transformed color signal.

16. A decoder according to claim 15, wherein said coded color image signals further include a second set of code values corresponding to the difference between the alternating components of each said at least one transformed color signal and the corresponding estimated alternating components, the decoder further comprising:

means for decoding and dequantizing each code value of said second set of code values; and means for adding to the estimated alternating components of each said at least one transformed color signal of the corresponding decoded difference values, so as to reconstitute the alternating components of each said at least one transformed color signal.

17. An application of the coding method according to claim 1 to the coding of still images.

18. An application of the coding method according to claim 1 to the coding of motion images.

19. A coding method according to claim 1 wherein the digitizing of the luminance signal is accomplished at a selected resolution and the sampling of the digitized luminance signal is accomplished at the same resolution.

20. A coder according to claim 10 wherein the means for digitizing said luminance signal digitizes the luminance signal at a selected resolution and the means for sampling the digitized luminance signal samples the digitized signal at the same resolution.

* * * * *

UNITED STATES PATENT AND TRADEMARK OFFICE
CERTIFICATE OF CORRECTION

PATENT NO. : 5,293,228

DATED : March 8, 1994

INVENTOR(S) : BERNARD MARTI

It is certified that error appears in the above-identified patent and that said Letters Patent is hereby corrected as shown below:

Col. 1, line 32, delete "Joint", insert --Joint--

Col. 9, line 52, delete "$A_{iR}$ and $A_{iB}$, insert --$\tilde{A}_{iR}$ and $\tilde{A}_{iB}$--

Col. 11, line 33, after "continuous", insert --component--

Col. 11, line 48, delete "form", insert --from--

Col. 13, line 44, before first occurrence of "component", insert --the continuous--

Signed and Sealed this

Ninth Day of August, 1994

Attest:

BRUCE LEHMAN

Attesting Officer

Commissioner of Patents and Trademarks